United States Patent
Kohli

(10) Patent No.: US 10,672,054 B2
(45) Date of Patent: Jun. 2, 2020

(54) SYSTEM AND METHOD FOR PURCHASE RECOMMENDATION FOR WALLET LINKED USER

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Singapore (SG)

( * ) Notice: Subject to any disclaimer, the term of this patent is extended or adjusted under 35 U.S.C. 154(b) by 835 days.

(21) Appl. No.: 15/133,959

(22) Filed: Apr. 20, 2016

(65) Prior Publication Data
US 2017/0308947 A1    Oct. 26, 2017

(51) Int. Cl.
*G06Q 30/06*    (2012.01)
*G06Q 30/02*    (2012.01)

(52) U.S. Cl.
CPC ..... *G06Q 30/0631* (2013.01); *G06Q 30/0251* (2013.01); *G06Q 30/0255* (2013.01)

(58) Field of Classification Search
CPC ..... G06Q 30/0251–0277; G06Q 30/06; G06Q 30/0601–0643; G06Q 30/08
See application file for complete search history.

(56) References Cited

U.S. PATENT DOCUMENTS 6,041,311 A * 3/2000 Chislenko .............. G06Q 30/02
705/26.7
9,754,292 B1 * 9/2017 Pattan ................ G06Q 30/0269
2005/0171955 A1 * 8/2005 Hull ........................ G06Q 50/01
2010/0312724 A1 * 12/2010 Pinckney ............... G06Q 30/02
706/11
2013/0031162 A1 * 1/2013 Willis ................. H04L 65/1069
709/203
2014/0195931 A1 * 7/2014 Kwon .................... G06Q 30/02
715/753
2016/0027118 A1 * 1/2016 Freeck .................. G06Q 40/08
705/4
2016/0275592 A1 * 9/2016 Mamgain ........... G06Q 30/0631
2017/0213272 A1 * 7/2017 Mowatt .............. G06Q 30/0631

OTHER PUBLICATIONS

Chennai-based Freshdesk buys social recommendations platform Frilp. By , ET Bureau | Updated: Oct. 3, 2015 (Year: 2015).*

* cited by examiner

*Primary Examiner* — William J Allen
(74) *Attorney, Agent, or Firm* — Buckley, Maschoff & Talwalkar LLC

(57) ABSTRACT

A method includes storing interaction data related to a first user and at least one other user. The interaction data is indicative of interactions among mobile devices operated by the users. The method further includes generating respective ranking data for each of the other users besides the first user. The ranking data is derived from the interaction data pursuant to at least one ranking rule. In addition, the method includes storing transaction data for the other users. The transaction data indicates product purchases made by the other users. An offer or product recommendation is selected based at least in part on the ranking data and the transaction data. The offer or product recommendation is transmitted to the first user.

8 Claims, 12 Drawing Sheets

SYSTEM AND METHOD FOR PURCHASE RECOMMENDATION FOR WALLET LINKED USER

BACKGROUND

Payment accounts are in widespread use for both in-store and online purchase transactions. FIG. 1 is a block diagram of a previously proposed version of a payment system (generally indicated by reference numeral 100) as it may operate in connection with an online purchase transaction.

The system 100 includes an e-commerce server computer 102 that may be operated by or on behalf of an online merchant to permit online shopping transactions. For this purpose, as is well known, the e-commerce server computer 102 may host a shopping website, sometimes referred to as an "online store". A customer 103 who operates a customer device 104 may access the shopping website by communicating over the Internet 105 with the e-commerce server computer 102. As is very well-known to those who are skilled in the art, the customer device 104 may be, for example, a personal computer or notebook computer that runs a browser program, a tablet computer or smartphone that runs a mobile browser and/or a suitable app, etc. As is very familiar to those who shop online, after the customer has selected one or more items of merchandise for purchase from the online store, he/she may elect to enter a checkout phase of the online purchase transaction. In some situations, during the checkout phase, the customer enters payment information, such as a payment account number, expiration date, security code, etc. into an online form. However, according to some proposals, the customer may be presented with an option to select use of the customer's digital wallet, which has been stored in a wallet service provider's computer 106. In some cases, the digital wallet may be accessed by the customer device 104 via a "wallet app" (i.e., an application program that runs on the customer device 104). The digital wallet may contain data relating to several of the customer's payment accounts, and selecting the digital wallet option may result in the customer being presented with the opportunity to select one of those payment accounts for use in the current online purchase transaction. Upon the customer indicating selection of one of the accounts in the digital wallet, the wallet service provider 106 may make the corresponding data (again, payment account number, expiration date, security code, etc.) for the selected account available to the merchant's e-commerce server 102.

In connection with the online purchase transaction, the e-commerce server computer 102 may transmit a transaction authorization request message (sometimes simply referred to as an "authorization request") to the merchant's acquirer financial institution ("acquirer" or "transaction acquirer"), indicated by reference numeral 110. Assuming that the digital wallet scenario described above had occurred, the authorization request may include the payment data provided from the wallet service provider 106 to the e-commerce server 102.

The acquirer 110 may route the authorization request via a payment network 112 to a server computer 114 operated by the issuer of the payment account that corresponds to the payment data included in the authorization request. Also, the authorization response generated by the issuer server computer 114 may be routed back to the acquirer 110 via the payment network 112. The acquirer 110 may confirm to the merchant (i.e., to the e-commerce server computer 102) that the transaction has been approved.

The payment network 112 may be, for example, the well-known Banknet® system operated by MasterCard International Incorporated, which is the assignee hereof.

The components of the system 100 as depicted in FIG. 1 are only those that are needed for processing a single transaction. Those who are skilled in the art will recognize that in the real world, online shopping and payment systems may process many purchase transactions (including simultaneous transactions) and may include a considerable number of payment account issuers and their computers, a considerable number of acquirers and their computers, and numerous merchants and their e-commerce servers. The system may also include a very large number of customers/online shoppers, who hold payment accounts that they use for their online shopping activities. In some environments there may also be a number of wallet service providers. It is also well known that elements of the system 100 (e.g., acquirers, the payment network, payment account issuers) may play similar roles in connection with in-store purchase transactions and in other types of transactions.

In some situations, the customer device 104 may run a wallet app that stores/manages/allows access to payment account credentials that are stored in the customer device 104 itself.

In some online transactions, a user authentication procedure may be included to help guard against fraudulent transactions. For example, some user authentication procedures may include biometric processing. That is, the customer/user may be challenged to provide a biometric characteristic (e.g., a fingerprint/thumbprint) to the customer's device. Data representative of the submitted biometric characteristic may be uploaded to a remote authentication service (not shown in FIG. 1). The authentication service may verify the uploaded biometric data against previously stored biometric reference data for the user to complete the user authentication. In other types of user authentication procedures, the user may be prompted to enter a PIN (personal identification number) or other data that is intended to be maintained as a secret by the user.

The present inventor has recognized an opportunity to expand capabilities of wallet apps so as to provide improved techniques for proposing offers or product purchase recommendations to users of customer devices.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, data is collected concerning interactions via a mobile device between the user of the mobile device and other users and their mobile devices. The data may be analyzed to rank the other users in terms of their closeness/"trustedness" relative to the first user. Product purchase histories of top ranking individuals among the other users may be accessed to generate product purchase recommendations to be submitted to the first user. When the first user engages in a transaction in which he/she accepts a product purchase recommendation in this system, the scoring of the transaction may give considerable weight to that fact, leading to a smooth authentication/approval process for the transaction.

Figure 2:
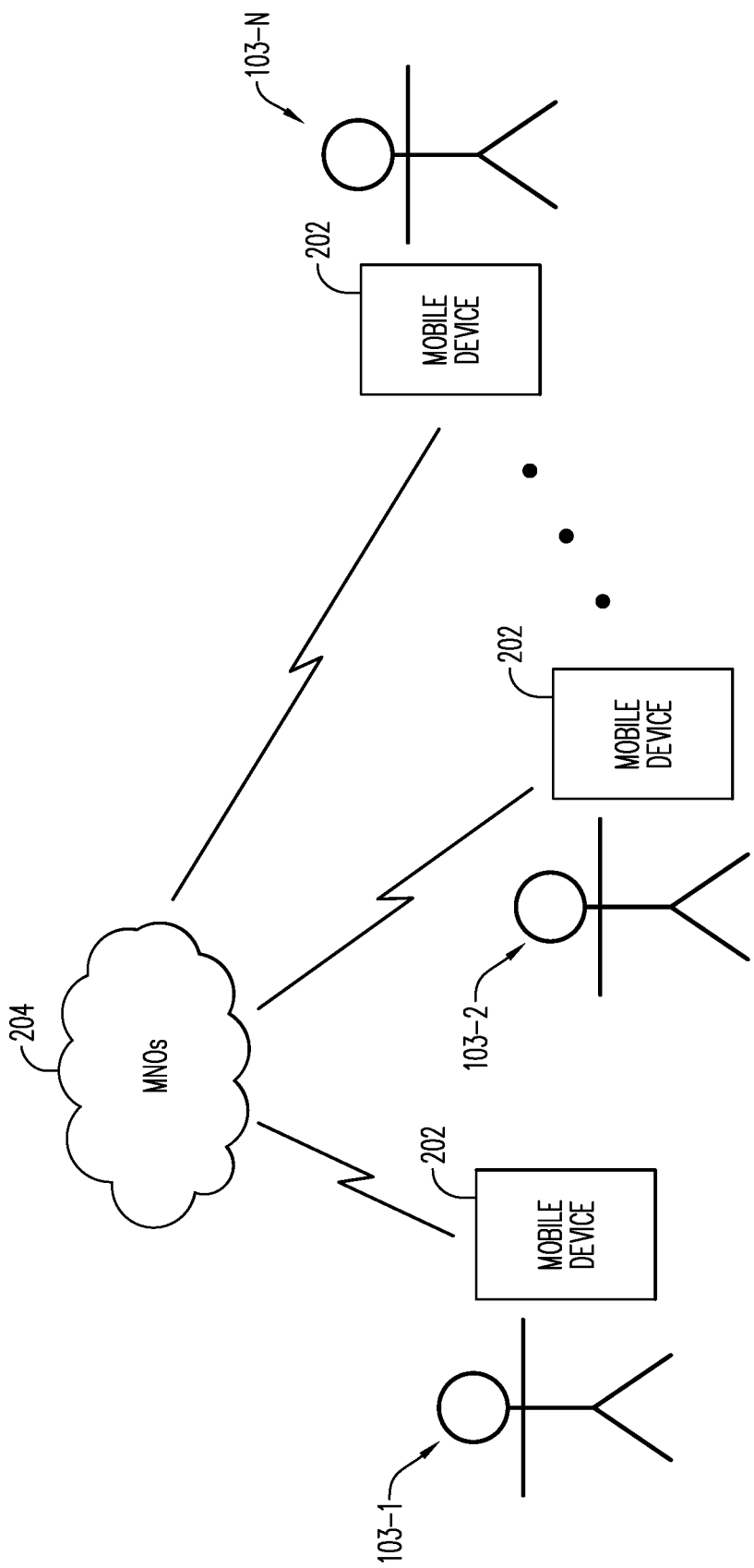
FIG. 2 is a block diagram that illustrates aspects of a product recommendation system provided according to the present disclosure.

FIG. 2 is a schematic diagram illustrating an environment in which aspects of the present disclosure are or may be applied.

Users 103-1 through 103-N are shown operating mobile devices 202. The use of the mobile devices includes, for example, communicating with other users via their mobile devices. The communications may include mobile telephone calls (voice communications), text messages, and real-time exchanges of chat messages via one or more real-time chat applications. Each of the mobile devices 202 may, in accordance with teachings of the present disclosure, be programmed to collect and record statistics regarding the communications by one user's mobile device 202 with other mobile devices. The statistics may indicate, for example: (a) the number of phone calls made and/or received during a given time period to/from each one of a number of different mobile devices and/or the total duration of such phone calls; (b) the number of text messages exchanged with each one of a number of different mobile devices; and (c) the duration of mobile chat sessions and/or the number of messages sent and/or received during the chat sessions with each one of a number of different mobile devices. In addition or alternatively, the mobile devices may make note and record the languages in which various voice and/or text and/or chat messages may be conducted. In some embodiments, other or additional indications of interactions among the mobile devices may be compiled.

Although only three figures of users 103 are expressly shown in FIG. 2, it should be understood that they are intended to represent thousands or even millions of users, so that "N" as it appears in the drawing may be a very large number. Concomitantly, the number of mobile devices 202 intended to be represented in FIG. 2 is also very large.

Communication among the mobile devices 202 is carried by a number of mobile network operators/mobile communication systems (cell phone networks), with the same being schematically represented at 204.

Figure 3:
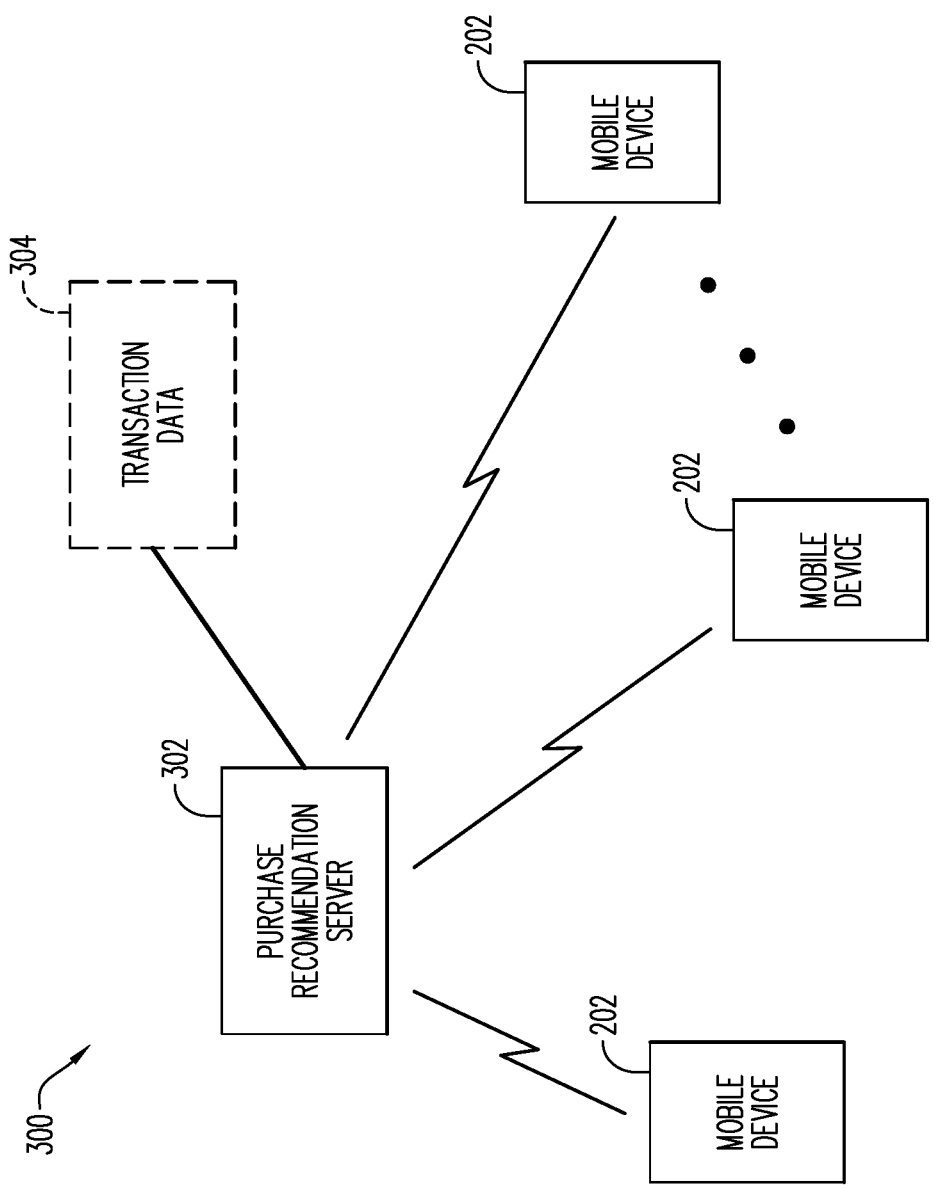
FIG. 3 is a block diagram that illustrates additional aspects of the product recommendation system.

Bearing in mind the environment illustrated in FIG. 2, it should be noted that a product purchase recommendation system 300 according to aspects of the present disclosure is schematically represented in FIG. 3. In FIG. 3, suitably programmed mobile devices 202, like those represented in FIG. 2, are shown in communication with a product purchase recommendation server computer 302. In some embodiments, the product purchase recommendation server computer 302 generates/selects product purchase recommendations based in part on the user-to-user communication statistics mentioned above in connection with FIG. 2. The product purchase recommendations may also be based on users' product purchase transaction data. In some embodiments, the product purchase recommendation server computer 302 may access the purchase transaction data from a remote source (shown in phantom and indicated by reference numeral 304). The product purchase recommendation server computer 302 may download/push the product purchase recommendations to the mobile devices 202 as a mode of communicating the product purchase recommendations to the users (not shown in FIG. 3) of the mobile devices 202.

In a preferred embodiment, and with respect to each individual user, collection of statistics as to the user's communications, and participation in the recommendation system 300, would occur only upon the user's express consent/opt-in to the data collection and to the generation and receipt of product purchase recommendations.

Figure 4:
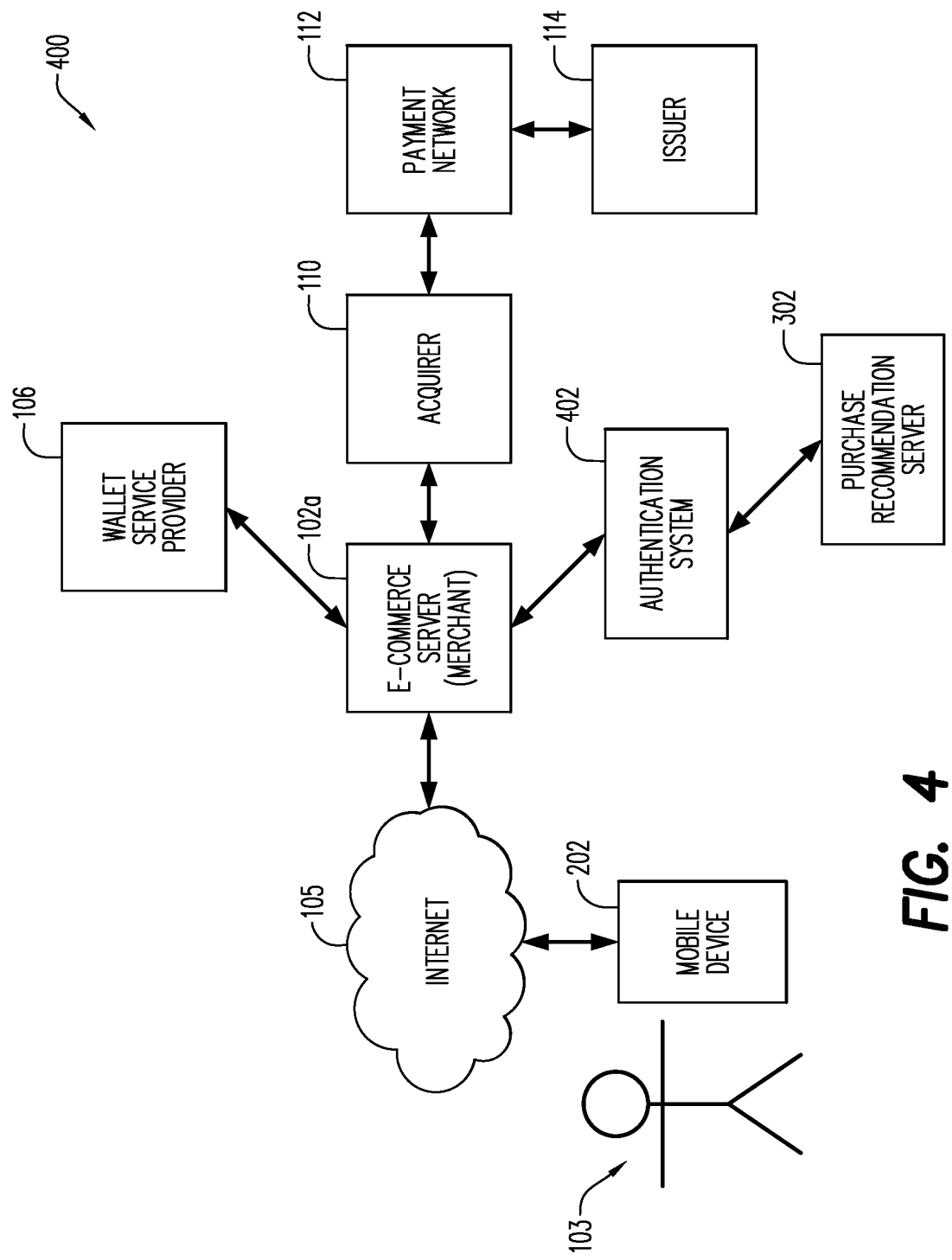
FIG. 4 is a block diagram that illustrates still further aspects of the product recommendation system.

FIG. 4 is a block diagram of a payment system 400 provided according to some embodiments. The payment system 400 may, in some aspects, operate in a cooperative manner with the recommendation system 300. The payment system 400 incorporates all of the elements referred to above in connection with FIG. 1. For example, elements/entities 103, 105, 106, 110, 112 and 114 may be carried over in the payment system 400 as depicted in FIG. 4 (with few if any modifications) from the depiction of the payment system 100 shown in FIG. 1. Further, an element designated by the reference numeral 102*a* (e-commerce server) in FIG. 4 corresponds to the element designated by reference numeral 102 in FIG. 1.

Moreover, according to aspects of the present disclosure, the payment system 400 also includes an authentication system 402. Details of the authentication system 402 will be discussed below. To briefly summarize some of the functionality of the authentication system 202, it may cooperate with the recommendation system 300 to streamline approval for transactions recommended by the recommendation system 300. In FIG. 4, for this purpose, the authentication system 402 is shown in communication with the product purchase recommendation server computer 302. In some embodiments, the authentication system 402 may be operated by the operator of the payment network 112. The product purchase recommendation server computer 302 may also be operated by the operator of the payment network 112 or by an affiliate thereof.

Figure 1:
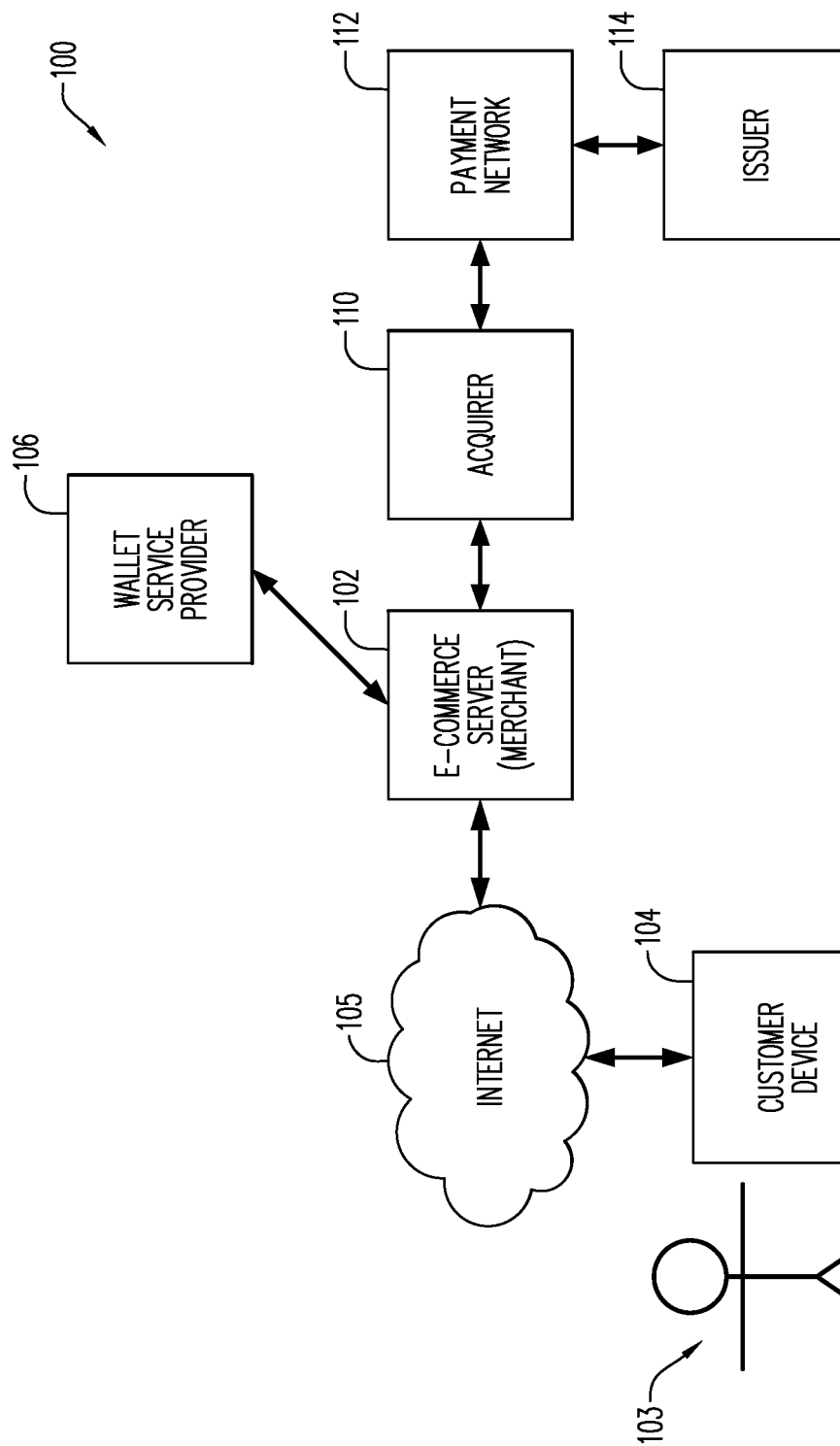
FIG. 1 is a block diagram that illustrates a conventional system that handles online purchase transactions.

Continuing to refer to FIG. 4, in the drawing a mobile device 202 (as per FIGS. 2 and 3) is shown playing the role of the "customer device" depicted in FIG. 1. Also, as will be appreciated from previous discussion—and from discussion to come—the mobile device 202 may exhibit functionality not present in the conventional role of the customer device 104 of FIG. 1.

In some embodiments, a modest augmentation of the functionality of the e-commerce server (indicated at 102*a*) in FIG. 4 may be present to support operation of the payment system 400 as described herein.

To discuss the subject matter of FIG. 4 more generally, it should be understood that in most cases, blocks labeled therein with names/descriptions of entities should also be understood to represent computer systems operated by or for such entities.

It should also be understood that, for at least some types of entities in the payment system 400, there may be a considerable or even a very large number of entities of those types in practical embodiments of the payment system 400.

Moreover, one or more components of the payment system 400 may handle in-store purchase transactions and/or other types of transactions in addition to online purchase transactions.

Figure 5:
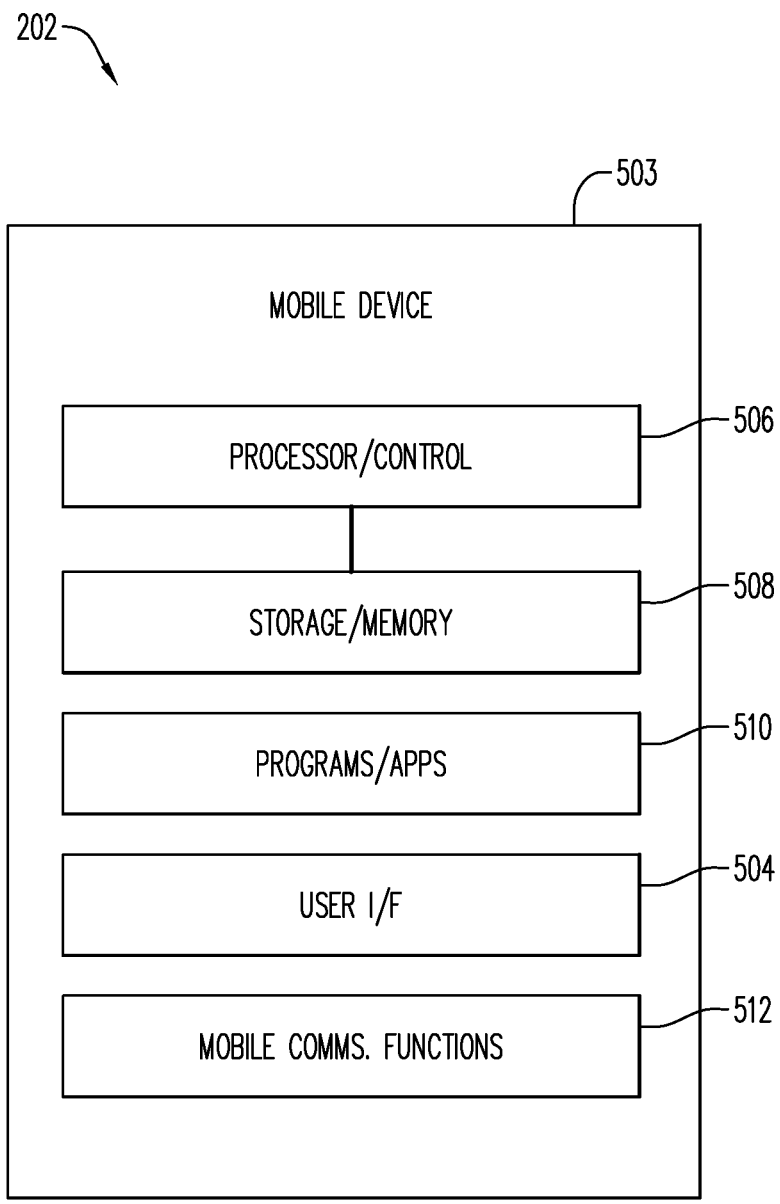
FIG. 5 is a block diagram that illustrates a typical mobile device that may play a role in the product recommendation system.

FIG. 5 is a block diagram of a typical embodiment of a mobile device 202 as referred to above. In particular, it is assumed (though this assumption should not be taken to be limiting), that the mobile device 202 is embodied as a smartphone.

Continuing to refer to FIG. 5, the mobile device 202 may include a housing 503. In many embodiments, the front of the housing 503 is predominantly constituted by a touchscreen (not separately shown), which is a key element of the user interface 504 of the mobile device 202.

The mobile device 202 further includes a mobile processor/control circuit 506, which is contained within the housing 503. Also included in the mobile device 202 is a storage/memory device or devices (reference numeral 508). The storage/memory devices 508 are in communication with the processor/control circuit 506 and may contain program instructions to control the processor/control circuit 506 to manage and perform various functions of the mobile device 202. As is well-known, a device such as mobile device 202 may function as what is in effect a pocket-sized personal computer (assuming for example that the mobile device is a smartphone), via programming with a number of application programs, or "apps", as well as a mobile operating system (OS). (The apps are represented at block 510 in FIG. 5, and may, along with other programs, in practice be stored in block 508, to program the processor/control circuit 506.) In accordance with aspects of the present disclosure, the programs/apps 510 may include one or more suitable apps for generating and/or detecting statistics, as described herein, that reflect interactions of the mobile device 202 with other mobile devices. In some embodiments, the apps 510 may also include one or more real-time chat applications that allow the user of the mobile device to engage in chat via data messaging with users of other mobile devices. The apps 510 may also include a wallet app with capabilities as described below.

As is typical for mobile devices, the mobile device 202 includes mobile communications functions as represented by block 512. The mobile communications functions 512 may include voice and data communications via the mobile communication network 204 (FIG. 2) with which the mobile device 202 is registered. Although not separately shown in FIG. 5, it should be understood that the mobile communications functions 512 may include hardware aspects such as a microphone, a speaker, an antenna, a transceiver circuit, etc., all supported in and/or on the housing 503. The antenna, for example, may receive signals from and transmit signals to a mobile communications network (not shown in FIG. 5). Text messaging and/or chat usage of the mobile device 202 may involve use of the user interface 504 (e.g., touchscreen, virtual keyboard), as is well known.

From the foregoing discussion, it will be appreciated that the blocks depicted in FIG. 5 as components of the mobile device 202 may in effect overlap with each other, and/or there may be functional connections among the blocks which are not explicitly shown in the drawing. It may also be assumed that, like a typical smartphone, the mobile device 202 may include a rechargeable battery (not shown) that is contained within the housing 503 and that provides electrical power to the active components of the mobile device 202.

It has been posited that the mobile device 202 may be embodied as a smartphone, but this assumption is not intended to be limiting, as mobile device 202 may alternatively, in at least some cases, be constituted by a tablet computer or by other types of mobile computing devices.

Figure 6:
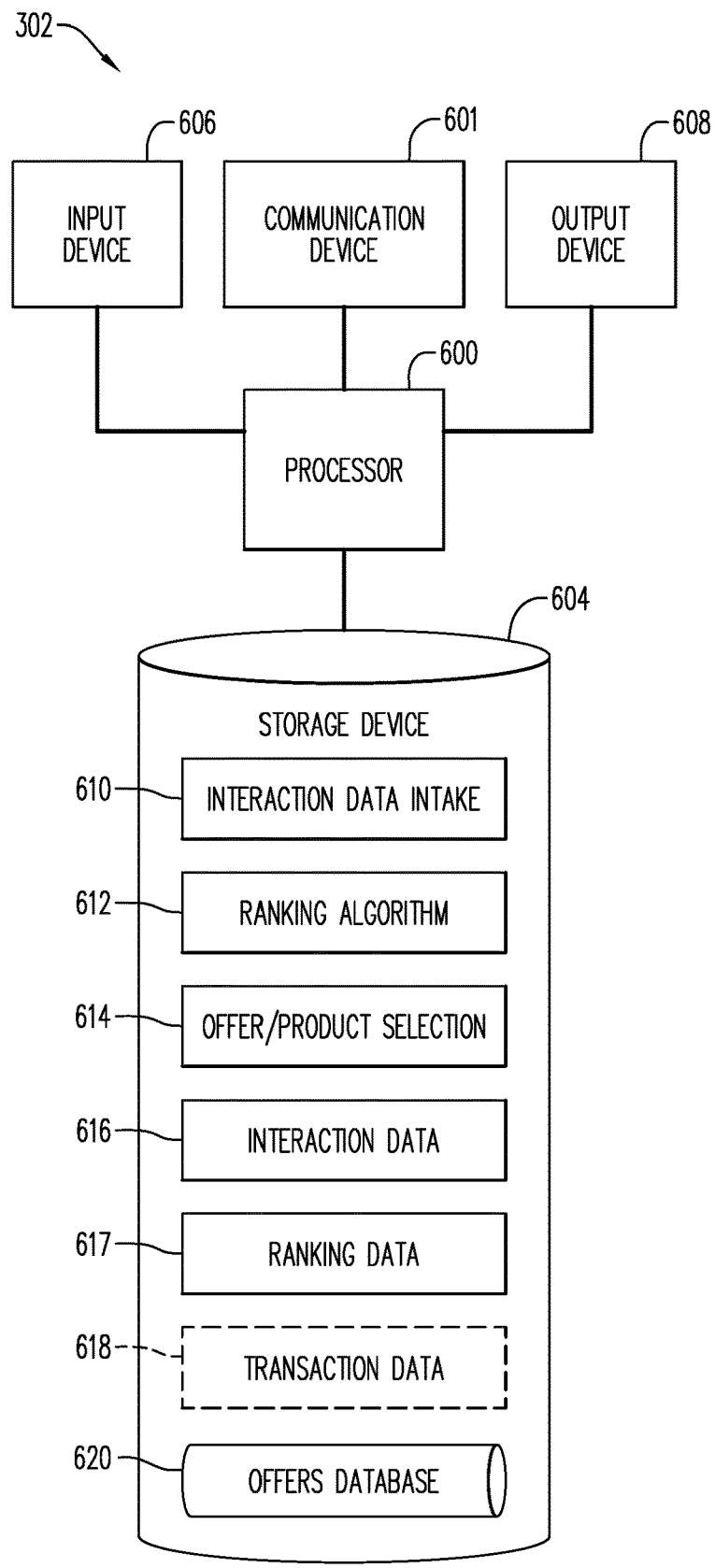
FIGS. 6 and 7 are block diagram representations of computers that may serve as components of the product recommendation system shown.

FIG. 6 is a block diagram representation of an embodiment of the product purchase recommendation server computer 302.

In some embodiments, hardware aspects of the product purchase recommendation server computer 302 may be constituted by typical server computer hardware, but may be controlled by software to cause it to function as described herein.

The product purchase recommendation server computer 302 may include a processor 600 operatively coupled to a communication device 601, a storage device 604, an input device 606 and an output device 608. The communication device 601, the storage device 604, the input device 606 and the output device 608 may all be in communication with the processor 600.

The processor 600 may be constituted by one or more processors. The processor 600 may operate to execute processor-executable steps, contained in program instructions described below, so as to control the product purchase recommendation server computer 302 to provide desired functionality.

Communication device 601 may be used to facilitate communication with, for example, other devices (such as mobile devices 202, FIG. 3). For example, communication device 601 may comprise numerous communication ports (not separately shown), to allow the product purchase recommendation server computer 302 to engage is many frequent and/or simultaneous communications, including product purchase recommendations, with the mobile devices 202.

Input device 606 may comprise one or more of any type of peripheral device typically used to input data into a computer. For example, the input device 606 may include a keyboard and a mouse. Output device 608 may comprise, for example, a display and/or a printer.

Storage device 604 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 604 stores one or more programs for controlling processor 600. The programs comprise program instructions (which may be referred to as computer readable program code means) that contain processor-executable process steps of the product purchase recommendation server computer 302, executed by the processor 600 to cause the product purchase recommendation server computer 302 to function as described herein.

The programs may include one or more conventional operating systems (not shown) that control the processor 600 so as to manage and coordinate activities and sharing of resources in the product purchase recommendation server computer 302, and to serve as a host for application programs (described below) that run on the product purchase recommendation server computer 302.

The programs stored in the storage device 604 may also include an interaction data intake program 610 that controls the processor 600 to cause the product purchase recommendation server computer 302 to operate so as to receive and store data provided by the mobile devices 202 (FIG. 3) relative to interactions among the mobile devices 202. As will be understood from previous and subsequent discussion, these interactions may include mobile phone calls, text messages and/or chat sessions.

Continuing to refer to FIG. 6, the storage device 604 may also store a ranking algorithm program 612. The ranking algorithm program 612 may control the processor 600 such that the product purchase recommendation server computer 302 uses the interaction data to determine, for each mobile device, ranking of other mobile devices in terms of the degree of affiliation or closeness between those other mobile devices and the first mobile device mentioned in this sentence. Alternatively, the ranking functionality, as described herein, may be performed at least in part on a distributed basis in the mobile devices 202, and the results of the ranking may be provided/uploaded from the mobile devices to the product purchase recommendation server computer 302.

Still further, the storage device 604 may store an application program 614 that controls the processor 600 to cause the product purchase recommendation server computer 302 to select offers or product recommendations for downloading to mobile devices 202. The manner in which the application program 614 causes the selections to be made will be described further below.

The storage device 604 may also store, and the product purchase recommendation server computer 302 may also execute, other programs, which are not shown. For example, such programs may include a reporting application, which may respond to requests from system administrators for reports on the activities performed by the product purchase recommendation server computer 302. The other programs may also include, e.g., device drivers, database management programs, communications software, etc.

The storage device 604 may also store a database 616 of the interaction data received (via operation of the program 610) from the mobile devices 202. In addition or alternatively, the storage device 604 may store a database 617 of ranking data which is produced by ranking algorithm program 612 and/or uploaded from mobile devices 202, as the case may be.

In some embodiments (e.g., if the external source of transaction data shown at 304 is not present), the storage device 604 may further store (in a database indicated at 618) such transaction data, which may, for example, have been supplied to the product purchase recommendation server computer 302 from the payment system 400 and/or from the mobile devices 202. As will be seen, the transaction data may be a source of input to processing performed by the offer/product recommendation selection program 614. The transaction data may represent product purchases made by users of the mobile devices 202.

Still further, the storage device 604 may store a database 620 of offers available for selection by the program 614 and downloading to the mobile devices 202 from the product purchase recommendation server computer 302.

In some embodiments, the storage device 604 may also store one or more additional databases (not separately shown) as required for operation of the product purchase recommendation server computer 302.

Figure 7:
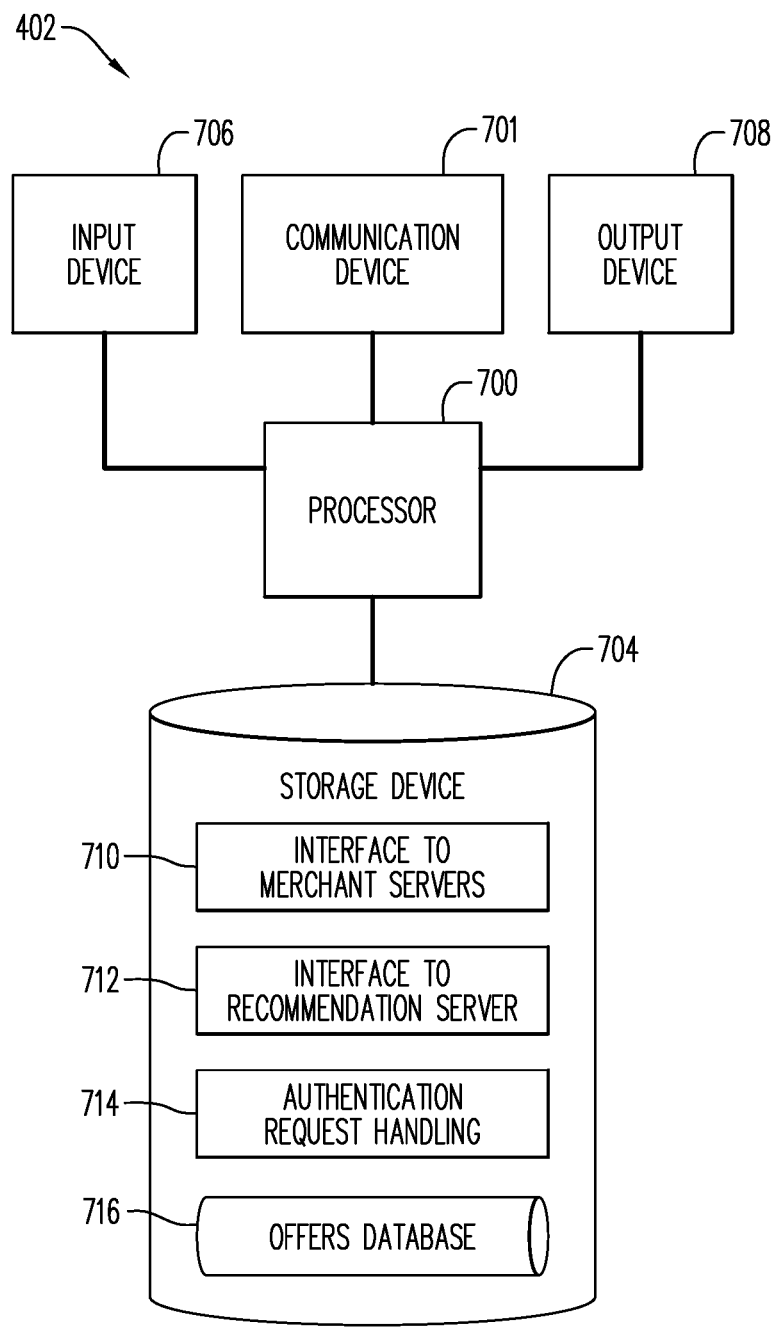

FIG. 7 is a block diagram of an embodiment of the authentication system 402.

In its hardware architecture and components, the authentication system 402 may, for example, resemble the hardware architecture and components described above in connection with FIG. 6. However, the authentication system 402 may be programmed differently from the product purchase recommendation server computer 302 so as to provide different functionality.

Returning again to the hardware aspects of the authentication system 402, it may include a processor 700, a communication device 701, a storage device 704, an input device 706 and an output device 708. The communication device 701, the storage device 704, the input device 706 and the output device 708 may all be in communication with the processor 700.

The above descriptions of the hardware components shown in FIG. 6 may, in some embodiments, also be applicable to the like-named components shown in FIG. 7.

Storage device 704 stores one or more programs for controlling processor 700. The programs comprise program instructions (which may be referred to as computer readable program code means) that contain processor-executable process steps of the authentication system 402, executed by the processor 700 to cause the authentication system 402 to function as described herein.

The programs may include one or more conventional operating systems (not shown) that control the processor 700 so as to manage and coordinate activities and sharing of resources in the authentication system 402, and to serve as a host for application programs (described below) that run on the authentication system 402.

The programs stored in the storage device 704 may also include a software interface 710 that controls the processor 700 to support communication between the authentication system 402 and merchant e-commerce servers such as the computer represented by block 102*a* in FIG. 4.

Further, and continuing to refer to FIG. 7, the storage device 704 may include a software interface 712 that controls the processor 700 to support communication between the authentication system 402 and the product purchase recommendation server computer 302.

In addition, the storage device 704 may store an authentication request handling application program 714. The authentication request handling application program 714 may control the processor 700 such that the authentication system 402 provides functionality as described herein in connection with responding to merchants' requests for authentication in connection with online shopping transactions.

The storage device 704 may also store, and the authentication system 402 may also execute, other programs, which are not shown. For example, such programs may include a reporting application, which may respond to requests from system administrators for reports on the activities performed by the authentication system 402. The other programs may also include, e.g., device drivers, database management programs, communications software, etc.

The storage device 704 may also store one or more databases (reference numeral 716) required for operation of the authentication system 202.

Other computer components of the payment system 400 (FIG. 4) and/or the recommendation system 300 may also have the same type of hardware architecture and/or components as described above in connection with FIG. 6, and may be suitably programmed for the respective roles of those computer components.

Figure 8:
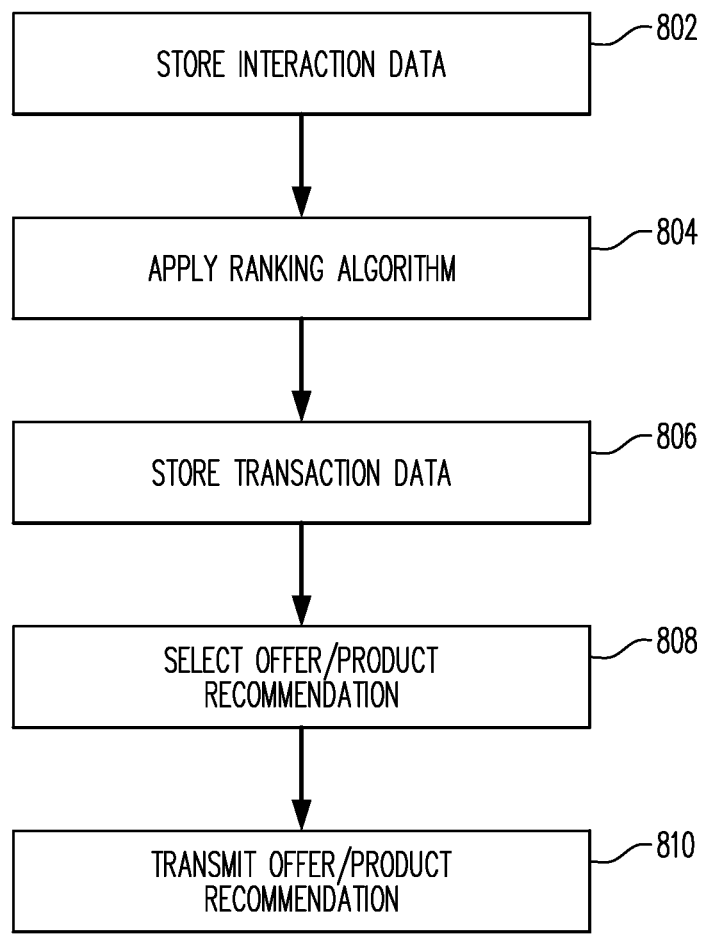
FIGS. 8, 9, 10, 11 and 12 are flow charts that illustrates aspects of the present disclosure.

FIG. 8 is a high-level flow chart that illustrates a process that may be performed in accordance with aspects of the present disclosure.

At 802 in FIG. 8, data related to interactions between one of the mobile devices 202 and at least one other of the mobile devices 202 may be stored in one or both of the first mobile device 202 and the product purchase recommendation server computer 302.

Figure 9:
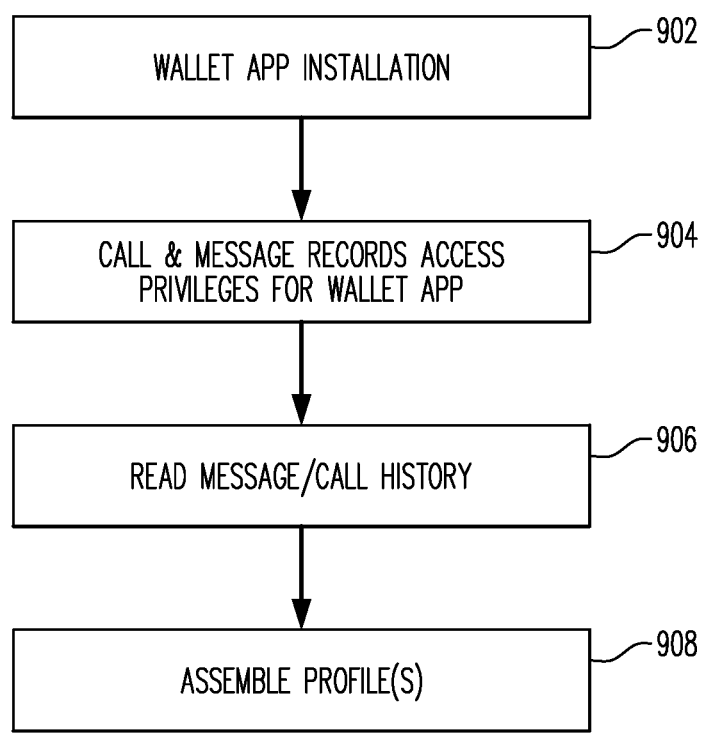

FIG. 9 is a flow chart that illustrates background and/or related processing relative to block 802 in FIG. 8. Referring now to FIG. 9, at block 902, a wallet app (as mentioned above in connection with FIG. 5), is installed in the mobile device 202. At block 904, the wallet app and/or the mobile device is configured such that the wallet app is permitted to have access privileges for obtaining access to phone call, text message and/or chat usage data stored and/or generated on the mobile device 202. At block 906, the wallet app reads the call/message/chat history for the mobile device for a predetermined period of time (e.g., for several months preceding the current point in time). At block 908, the wallet app assembles a profile or profiles indicative of the mobile device's interaction history with each of a number of different mobile devices with which it has interacted during the period for which the call/message/chat history was read by the wallet app. Each of the profiles may correspond to a respective one of the other mobile devices with which the mobile device running the wallet app has interacted.

Referring again to FIG. 8, at block 804, a ranking algorithm is performed with respect to the profiles to assess a degree of personal closeness or trust between the user of the mobile device running the wallet app and the users of the other mobile devices (i.e., the mobile devices that were the subject of the profiles referred to at block 908). This ranking may be done by the wallet app. Alternatively, this ranking may be performed at the product purchase recommendation server computer 302 after uploading of the profiles from the mobile device 202 to the product purchase recommendation server computer 302. (In cases where the ranking is performed at the mobile device 202, it may be the case that the profiles are not uploaded from the mobile device 202 to the product purchase recommendation server computer 302.)

Figure 10:
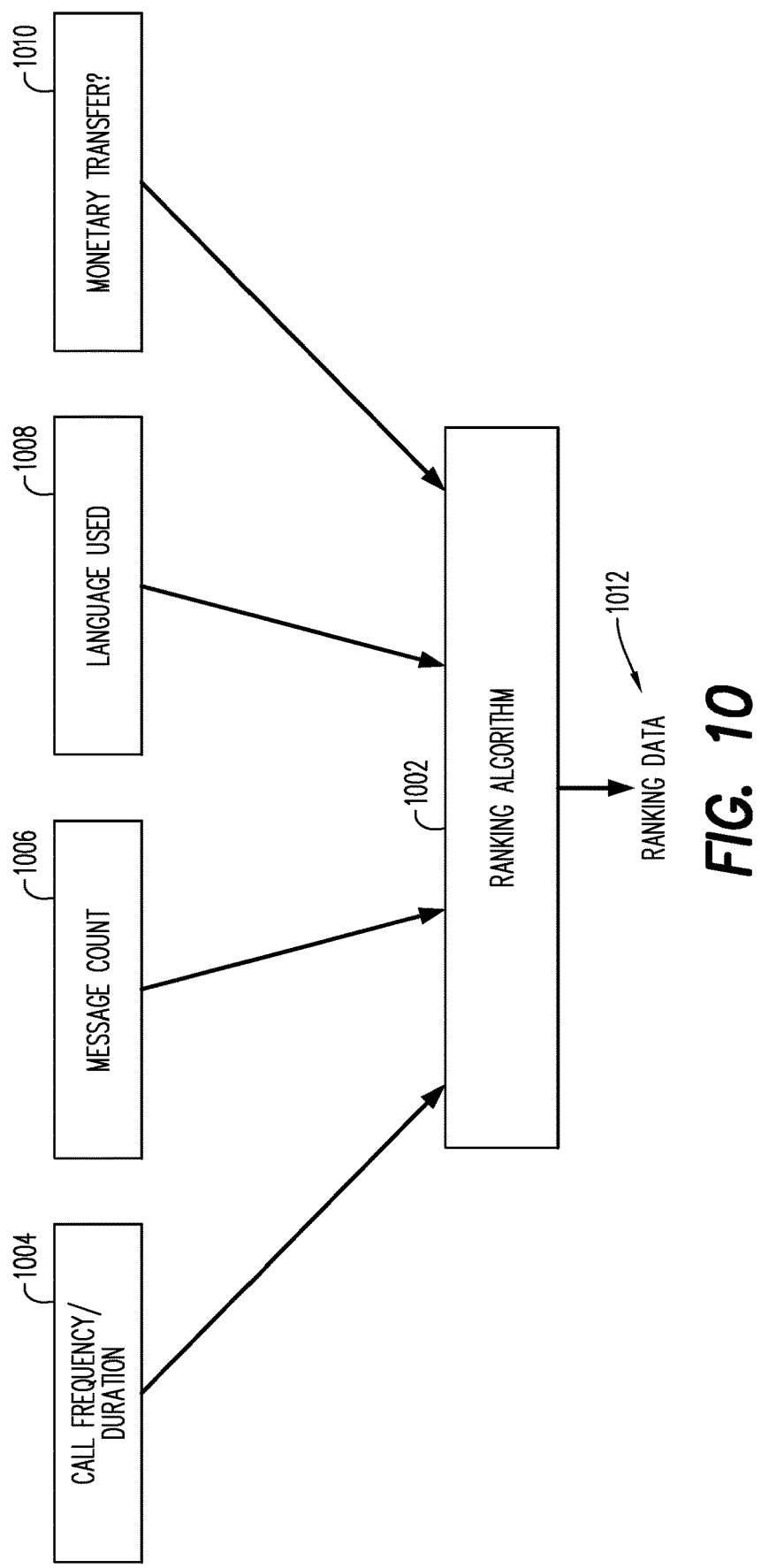

FIG. 10 schematically illustrates aspects of the processing performed at 804. Referring to FIG. 10, the profile ranking algorithm (block 1002) may have a number of inputs, including for example (and for each profile to be ranked): (a) call frequency and/or cumulative and/or average duration (block 1004); (b) the number of text messages recorded in the respective profile (block 1006); (c) the language used or predominantly used (block 1008) in the interactions reflected in the profile; and/or (d) whether person-to-person and/or account-to-account monetary transfers (block 1010)—and if so, how many—have occurred that involved the user's mobile device and the mobile device that is the subject of the profile.

In addition or alternatively, another input to the ranking algorithm may include one or more statistics relating to chat sessions engaged in between the user's mobile device and the mobile device that is the subject of the profile. Such statistics may include frequency, duration, and/or number of exchanged messages relative to chat sessions between the two mobile devices.

The ranking algorithm 1002 may take a variety of forms. For example, each profile may be given a ranking score according to a formula based upon the types of inputs referred to in this discussion of FIG. 10. The scoring formula may, for example, apply various weights or scoring total bonuses to the types of inputs and may sum the weighted statistics and/or the scoring total bonuses to arrive at a total ranking score. The ranking algorithm 1002 may include one or more rules that govern, for example, process steps such as applying weighting to one or more of the input interaction statistics and/or calculating ranking scores.

In some embodiments, for example, if the user is based in a country where English is the primary language, there may be a large scoring total bonus attributed to a mobile device profile that shows substantial use of a language other than English, as such language usage may imply closeness between the users of the two mobile devices. Similarly, an indication of a monetary transfer involving the two mobile devices may imply closeness/trust between the users of the mobile devices, particularly if the monetary transfers are repeated and/or numerous. Accordingly, in such situations, the ranking algorithm may call for according a large scoring total bonus where numerous monetary transfers involving the two mobile devices are indicated by the mobile device profile.

Ranking data (reference numeral 1012 in FIG. 10) may be output from the ranking algorithm 1002. The ranking data may include, for example, ordinal ranks of the other users/other mobile devices—e.g., according to decreasing value of ranking scores—and/or total ranking scores for the other users/other mobile devices. In some embodiments, if this data is generated at the mobile device/wallet app level, then the data may be uploaded from the mobile device 202 to the product purchase recommendation server computer 302.

An overall outcome of the ranking algorithm 1002 may be to assign high ranks to other users/devices that have a high volume of interactions and/or highly meaningful interactions with the user/device from which the interaction data is being processed.

In addition to uploading profile and/or ranking data to the product purchase recommendation server computer 302, the mobile device 202 (or the product purchase recommendation server computer 302, as the case may be) may also inform that user that these steps have been successfully performed.

Referring again to FIG. 8, at block 806, transaction records are stored. This may occur, for example, at the product purchase recommendation server computer 302 and/or at another transaction record store (which may, for example, be affiliated with the payment network 112 (FIG. 4)). The transaction records may include data relating to purchase transactions performed using the mobile devices 202 (and/or wallet apps on the mobile devices) of the various users. The transaction records may include the date of the transaction, and may also include product details, such as a product description and/or the brand, make, and/or model of an item purchased.

Figure 11:
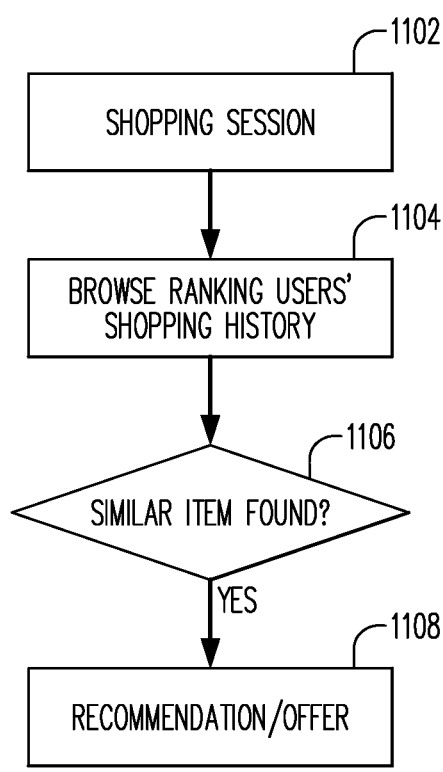

Continuing to refer to FIG. 8, block 808 represents processing performed by the product purchase recommendation server computer 302 to select products and/or offers for presentation to a user via a mobile device 202. FIG. 11 is a flow chart that illustrates an example embodiment of the processing at block 808.

Referring to FIG. 11, at block 1102, the user of a mobile device 202 engages in a shopping session with the e-commerce server 102a. The e-commerce server 102a may inform the product purchase recommendation server computer 302 that the shopping session has begun and may identify the user to the product purchase recommendation server computer 302. For example, the user may be identified based on a serial/identification number for the instantiation of the wallet app that runs on the user's mobile device 202. The e-commerce server 102a may also report to the product purchase recommendation server computer 302 what types of products the user is viewing on the online shopping website. Based on this information, and as indicated at block 1104 in FIG. 11, the product purchase recommendation server computer 302 may browse recent online purchase transactions (or other—e.g., in-store, transactions) entered into by other users (i.e., via their mobile devices) who were highly ranked at the process of FIG. 10 relative to the user who engaged in the shopping session at 1102. (The latter user may be referred to as the "current shopper".)

A decision block 1106 may follow or accompany block 1104. At decision block 1106, the product purchase recommendation server computer 302 may determine whether the browsing of the highly ranked other users' transactions yielded a relevant recent transaction—i.e., a purchase by another user (who was highly ranked relative to the current shopper) of an item similar to items that the current shopper is viewing during the current online shopping session. If so, then block 1108 may follow decision block 1106. At block 1108, the product purchase recommendation server computer 302 may select and/or generate a product recommendation and/or an offer that reflects one or more items bought by other users who ranked highly in view of their interactions with the current shopper.

Referring again to decision block 1106, if the product purchase recommendation server computer 302 does not find a relevant purchase by a high ranking user relative to the current shopper, then it may be the case that no product recommendation or offer is selected.

Referring again to FIG. 8, at block 810, the product purchase recommendation server computer 302 may transmit the product recommendation and/or offer (generated/selected at 1108 in FIG. 11) to the mobile device 202 of the current shopper. The recommendation/offer may be displayed to the user interface of the mobile device 202 so as to be visible to and actionable by the current shopper. In some embodiments, the recommendation/offer may include language to the effect of, "Your contact Mike bought [this item] a week ago." In this case, the contact's photo, if available, may also be included with the recommendation/offer.

There may be a high likelihood that the recommended product and/or the offer may be attractive to the current shopper, in view of the closeness or trust (relative to the current shopper) that may be inferred from the high ranking (among the current shopper's contacts) of the other user who recently made a relevant purchase.

Other scenarios of product recommendations based on recent purchases by high ranking users (relative to a current shopper/target user) may also take place in the recommendation system 300 shown in FIG. 3. For example, assume that user A, who is very highly ranked relative to user B, has just purchased tickets (via a wallet app on user A's mobile device 202) to a home game for the local professional football team. This event (the ticket purchase) may be reported to the product purchase recommendation server computer 302. The product purchase recommendation server computer 302 may respond to this report by sending a message to user B (via user B's mobile device 202) to suggest that user B also buy tickets to the upcoming home game. Thus product purchase recommendations may be generated at a time when the recipients of the recommendations are not engaged in a shopping session.

Figure 12:
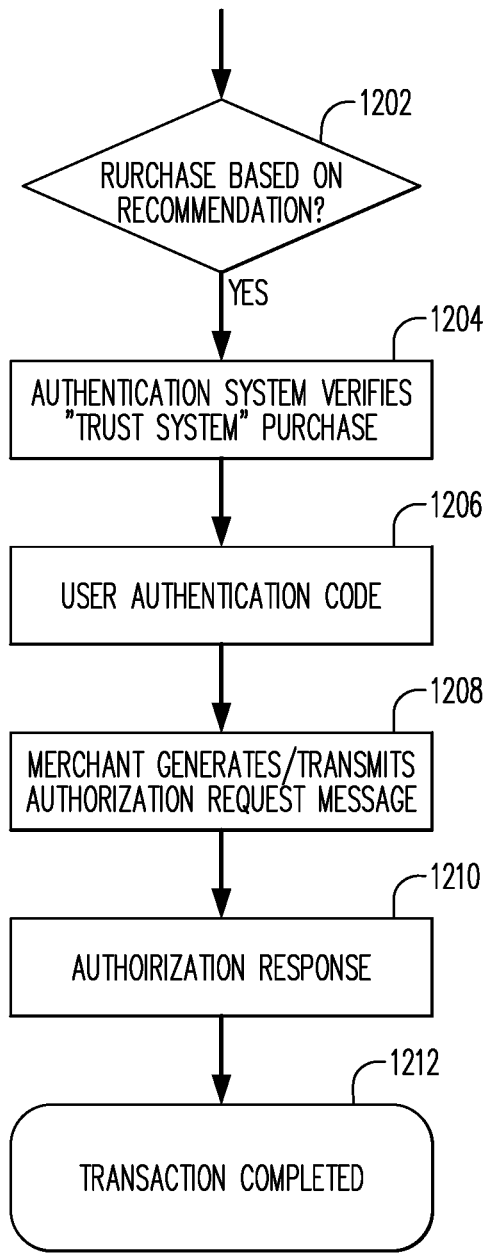

FIG. 12 is a flow chart that illustrates another process that may be performed according to aspects of the present disclosure. The authentication system 402 (FIG. 4) may play a central role in the process illustrated in FIG. 12.

It is assumed for purposes of FIG. 12, that a user has accepted/followed through/initiated a purchase transaction in accordance with a product purchase recommendation or offer transmitted to him/her in accordance with block 810. It may further be assumed that the resulting purchase transaction is submitted by the corresponding merchant to the authentication system 402 for scoring the transaction as to the degree of risk presented by the transaction and/or for an indication as to whether it is safe to consummate the purchase transaction. It may be still further assumed that the information provided to the authentication system, from the merchant and/or from the product purchase recommendation server computer 302 is indicative that the purchase transaction is responsive to a recommendation/offer selected by the product purchase recommendation server computer 302 and sent from the product purchase recommendation server computer 302 to the purchaser.

At a decision block 1202 in FIG. 12, the authentication system determines whether the current transaction is based on a recommendation or offer of the kind just referred to. If so (and in accordance with the assumptions stated above), then block 1204 may follow decision block 102. At block 1204, the authentication system 402 may determine that the current transaction arose from the afore-described type of product recommendation/offer, and thus was derived from a system that infers trust between a previous purchaser and the current purchaser. It is therefore highly unlikely that the current purchase is fraudulent or improper. Accordingly, the authentication system 402 may provide (as per block 1206, FIG. 12) a suitable code to the merchant that the purchaser may be deemed to have been authenticated and/or that the risk of fraud is low. Then at block 1208, the merchant may generate a more or less conventional transaction authorization request message to be routed to the account issuer (in a manner described above in connection with FIG. 1). At block 1210, the merchant may receive an authorization response (i.e., reflecting the account issuer's determination as to whether all is in order with the user's payment account). Block 1212 represents completion of the current purchase transaction.

Referring again to decision block 1202, if there was no recommendation or offer (of the kind discussed in connection with FIG. 11), then—in a process branch which is not shown in the drawing—a conventional user and/or device authentication process may be undertaken.

In a process such as that illustrated in FIG. 12, the provenance of the purchase transaction (i.e., its origin from a product purchase recommendation or offer from the product purchase recommendation server computer 302) may allow for streamlining of the process for vetting the transaction, and may allow other vetting steps, such as user and/or device authentication, to be omitted. Thus there may be a high degree of convenience for the user with this type of process.

In some embodiments, functions ascribed above to the wallet app (as modified to facilitate ranking of users based on interaction data) may alternatively be performed by a dedicated app or other app in the mobile device different from the wallet app.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

As used herein and in the appended claims, a "server" includes a computer device or system that responds to numerous requests for service from other devices.

The flow charts and descriptions thereof herein should not be understood to prescribe a fixed order of performing the method steps described therein. Rather the method steps may be performed in any order that is practicable, including simultaneous performance of steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
   recording, by a first device, interaction data of a user with a chat application installed on the first device, said interaction data indicating a cumulative amount of chat interaction using the chat application between the user of the first mobile device and each of a plurality of other individuals, said chat interaction performed between the first mobile device and respective devices operated by the other individuals, the first device further comprising a wallet application installed thereon, the wallet application configured to:
   (i) access a memory of the first device; and,
   (ii) communicate with a remote computer;
   storing, in the memory of the first device, the recorded interaction data;
   accessing, by the wallet application, the interaction data of the user from the memory of the first device;
   communicating, by the wallet application to the remote computer, the accessed interaction data;
   generating, by the remote computer, respective ranking data for each of said other individuals, said ranking data derived at least in part from the chat interaction data pursuant to at least one ranking rule;
   storing, by the remote computer, transaction data for the other individuals, the transaction data indicative of product purchases made by the other individuals;
   selecting, by the remote computer, an offer or product recommendation based at least in part on the ranking data and the transaction data; and
   transmitting, from the remote computer to the first mobile device, the selected offer or product recommendation; and,
   displaying, by an interface of the first device, the selected offer or recommendation.

2. The method of claim 1, wherein the ranking data is generated, at least in part, by applying a ranking algorithm to the chat interaction data, the ranking algorithm employing said at least one ranking rule.

3. The method of claim 2, wherein:
   the ranking data reflects a rank ordering of said plurality of other individuals based on results of applying the ranking algorithm to the chat interaction data.

4. The method of claim 3, wherein the ranking algorithm includes applying respective weights to each of a plurality of types of interaction, including the chat interaction indicated by the chat interaction data.

5. The method of claim 1, wherein said ranking data is based at least in part on data that indicates at least one language in which said user of the first mobile device interacts with said plurality of other individuals.

6. The method of claim 1, wherein said ranking data is based at least in part on at least one monetary transfer between said user of the first mobile device and said plurality of other individuals.

7. A mobile device comprising:
   a processor; and
   a memory in communication with the processor, the processor storing program instructions, the processor operative with the program instructions to perform functions as follows:
   recording, in the memory of the mobile device, interaction data of a user with a chat application installed on the mobile device, said interaction data indicating a cumulative amount of chat interaction using the chat application between the user of the mobile device and each of a plurality of other individuals, said chat interaction performed between the mobile device and respective devices operated by the other individuals, the first device further comprising a wallet application installed thereon, the wallet application configured to:
   (i) access the memory of the mobile device; and,
   (ii) communicate with a remote computer;
   accessing, by the wallet application, the interaction data of the user from the memory of the first device;
   generating respective ranking data for each of said other individuals, said ranking data derived at least in part from the chat interaction data pursuant to at least one ranking rule;
   communicating the ranking data by the wallet application to a remote computer;
   receiving, from the remote computer, an offer or product recommendation, said offer or product recommendation having been selected by the remote computer based at least in part on transaction data and the communicated ranking data, the transaction data indicative of product purchases made by the other individuals; and,
   displaying, by an interface of the first device, the selected offer or recommendation.

8. A method comprising:
   recording, by a first device, interaction data of a user with a chat application installed on the first device, said interaction data indicating a cumulative amount of chat interaction using the chat application between the user of the first mobile device and each of a plurality of other individuals, said chat interaction performed between the first mobile device and respective devices operated by the other individuals, the first device further comprising a wallet application installed thereon, the wallet application configured to:
(i) access a memory of the first device; and,
(ii) communicate with a remote computer;
storing, in the memory of the first device, the recorded interaction data;
accessing, by the wallet application, the interaction data of the user from the memory of the first device;
generating, by the wallet application, respective ranking data for each of said other individuals, said ranking data derived at least in part from the chat interaction data pursuant to at least one ranking rule;
communicating, by the wallet application to the remote computer, the ranking data;
storing, by the remote computer, transaction data for the other individuals, the transaction data indicative of product purchases made by the other individuals;
selecting, by the remote computer, an offer or product recommendation based at least in part on the ranking data and the transaction data;
transmitting, from the remote computer to the first mobile device, the selected offer or product recommendation; and
displaying, by an interface of the first device, the selected offer or recommendation.

* * * * *

UNITED STATES PATENT AND TRADEMARK OFFICE
CERTIFICATE OF CORRECTION

| | | |
|---|---|---|
| PATENT NO. | : 10,672,054 B2 | Page 1 of 1 |
| APPLICATION NO. | : 15/133959 | |
| DATED | : June 2, 2020 | |
| INVENTOR(S) | : Manoneet Kohli | |

It is certified that error appears in the above-identified patent and that said Letters Patent is hereby corrected as shown below:

On the Title Page

Item (73) Assignee:
Replace the Assignee's Residence "Singapore, (SG)"
With -- Purchase, NY (US) --

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*